US009166758B2

(12) United States Patent
Lee et al.

(10) Patent No.: US 9,166,758 B2
(45) Date of Patent: Oct. 20, 2015

(54) METHOD AND USER EQUIPMENT FOR TRANSMITTING UPLINK CONTROL INFORMATION

(75) Inventors: Moonil Lee, Anyang-si (KR); Jiwoong Jang, Anyang-si (KR); Jaehoon Chung, Anyang-si (KR); Seunghee Han, Anyang-si (KR); Hyunsoo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 13/821,116

(22) PCT Filed: Sep. 20, 2011

(86) PCT No.: PCT/KR2011/006927
§ 371 (c)(1),
(2), (4) Date: Mar. 6, 2013

(87) PCT Pub. No.: WO2012/039571
PCT Pub. Date: Mar. 29, 2012

(65) Prior Publication Data
US 2013/0163521 A1    Jun. 27, 2013

Related U.S. Application Data

(60) Provisional application No. 61/384,328, filed on Sep. 20, 2010, provisional application No. 61/386,571, filed on Sep. 27, 2010, provisional application No. 61/387,452, filed on Sep. 28, 2010.

(51) Int. Cl.
*H04L 5/00* (2006.01)
*H04W 72/04* (2009.01)
*H04L 27/34* (2006.01)

(52) U.S. Cl.
CPC ............ *H04L 5/0053* (2013.01); *H04L 5/0007* (2013.01); *H04L 27/3477* (2013.01); *H04W 72/0413* (2013.01)

(58) Field of Classification Search
CPC . H04L 5/0053; H04L 5/0007; H04L 27/3477; H04W 72/0413
See application file for complete search history.

(56) References Cited

U.S. PATENT DOCUMENTS

| 2008/0285524 | A1* | 11/2008 | Yokoyama | 370/336 |
|---|---|---|---|---|
| 2008/0316099 | A1* | 12/2008 | Fujii | 342/373 |
| 2009/0238241 | A1* | 9/2009 | Hooli et al. | 375/133 |
| 2010/0311343 | A1* | 12/2010 | Keerthi | 455/63.1 |
| 2011/0013684 | A1* | 1/2011 | Semenov et al. | 375/232 |

FOREIGN PATENT DOCUMENTS

| JP | 11-178050 | 2/1999 |
|---|---|---|
| KR | 20060049749 A | 5/2006 |

OTHER PUBLICATIONS

R1-81699, 3GPP TSG-RAN Meeting #52bis, Shenzhen, China, Mar. 31-Apr. 4, 2008.*

(Continued)

*Primary Examiner* — Alpus H Hsu
*Assistant Examiner* — Anthony Luo
(74) *Attorney, Agent, or Firm* — Dentons US LLP

(57) ABSTRACT

A user equipment (UE) transmits uplink control information (UCI) of 3 bits or more to a base station (BS) after modulating the UCI into 1-bit or 2-bit sub-UCI units. Here, the UE maps each 1-bit or 2-bit sub-UCI unit to one of a plurality of corner constellation points regardless of modulation order of data which is multiplexed with the UCI. The corner constellation points are points having a maximum Euclidean distance from among a plurality of constellation points corresponding to the modulation order.

10 Claims, 6 Drawing Sheets

(56) References Cited

OTHER PUBLICATIONS

R1-081699, 3GPP TSG-RAN Meeting #52bis, Shenzhen, China, Mar. 31-Apr. 4, 2008.

R1-081666, 3GPP TSG-RAN WG1 #52bis, Shenzhen, China, Mar. 31-Apr. 4, 2008.

R1-071494, 3GPP TSG-RAN WG1 #48bis, St. Julian, Malta, Mar. 26-30, 2007.

* cited by examiner (a) 64QAM (b) 16QAM (a) QPSK

✕ : corner constellation point (a) 64QAM (b) 16QAM (a) QPSK

X : corner constellation point

METHOD AND USER EQUIPMENT FOR TRANSMITTING UPLINK CONTROL INFORMATION

This Application is a 35 U.S.C. §371 National Stage Entry of International Application No. PCT/KR2011/006927, filed Sep. 20, 2011 and claims the benefit of U.S. Provisional Application Nos. 61/384,328, filed Sep. 20, 2010; 61/386,571, filed Sep. 27, 2010, and 61/387,452, filed Sep. 28, 2010, all of which are incorporated by reference in their entirety herein.

TECHNICAL FIELD

The present invention relates to a wireless communication system, and more particularly, to a method and apparatus for transmitting uplink control information.

BACKGROUND ART

Wireless communication systems are widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi-Carrier Frequency Division Multiple Access (MC-FDMA) system, and the like.

Along with development of wireless communication technology, the amount of data that can be transmitted has increased and the amount of control information associated with data transmission has also increased. Thus, there is a need to provide a method for efficiently transmitting such an increased amount of control information.

DISCLOSURE OF INVENTION

Technical Problem

The present invention provides a method and apparatus for transmitting uplink control information in a wireless communication system. Specifically, the present invention suggests a method for efficiently transmitting uplink control information of a specific number of bits or more from a User Equipment (UE) to a Base Station (BS).

It is to be understood that objects to be achieved by the present invention are not limited to the aforementioned objects and other objects which are not mentioned will be apparent to those of ordinary skill in the art to which the present invention pertains from the following description.

Solution to Problem

Accordingly, the present invention is directed to a method and a user equipment (UE) for transmitting uplink control information and a method and a base station (BS) for receiving uplink control information. To achieve these objects and other advantages and in accordance with the purpose of the invention, as embodied and broadly described herein, a method for transmitting n-bit uplink control information from a user equipment to a base station in a wireless communication system, where n is a positive integer greater than 2, is provided. The method comprises: dividing the n-bit uplink control information into ceiling (n/2) sub-groups; mapping each of the sub-groups to one of 4 orthogonal modulation symbols that are complex modulation symbols having a maximum Euclidean distance from among a plurality of modulation symbols corresponding to a modulation order; and transmitting the mapped uplink control information to the base station.

In another aspect of the present invention, a user equipment for transmitting n-bit uplink control information to a base station in a wireless communication system, where n is a positive integer greater than 2, is provided. The user equipment comprises: a transmitter; and a processor, electrically connected to the transmitter, configured to control the transmitter, wherein the processor divides the n-bit uplink control information into ceiling (n/2) sub-groups, maps each of the sub-groups to one of 4 orthogonal modulation symbols that are complex modulation symbols having a maximum Euclidean distance from among a plurality of modulation symbols corresponding to a modulation order, and controls the transmitter to transmit the mapped uplink control information to the base station.

In each aspect of the present invention, the user equipment may multiplex uplink data with the uplink control information, wherein the user equipment maps each of the sub-groups to one of the 4 modulation symbols regardless of a modulation order of the uplink data.

In each aspect of the present invention, the 4 modulation symbols may correspond respectively to 4 corner points located at corners from among a plurality of points on a signal constellation corresponding respectively to the plurality of modulation symbols.

In each aspect of the present invention, the user equipment may perform channel encoding of each of the sub-groups according to the modulation order of the uplink data, wherein the user equipment maps each of the channel-encoded sub-groups to one of the 4 modulation symbols.

In each aspect of the present invention, the modulation order of the uplink data may be one of QPSK, 16 QAM, and 64 QAM.

The aforementioned technical solutions are only a part of the embodiments of the present invention, and various modifications to which technical features of the present invention are applied could be understood by those of ordinary skill in the art to which the present invention pertains, based on the following detailed description of the present invention.

Advantageous Effects of Invention

According to the present invention, it is possible to reduce a transmission error rate of uplink control information having a large number of bits.

It is also possible to prevent uplink control information from being totally lost when a transmission error has occurred in the control information.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
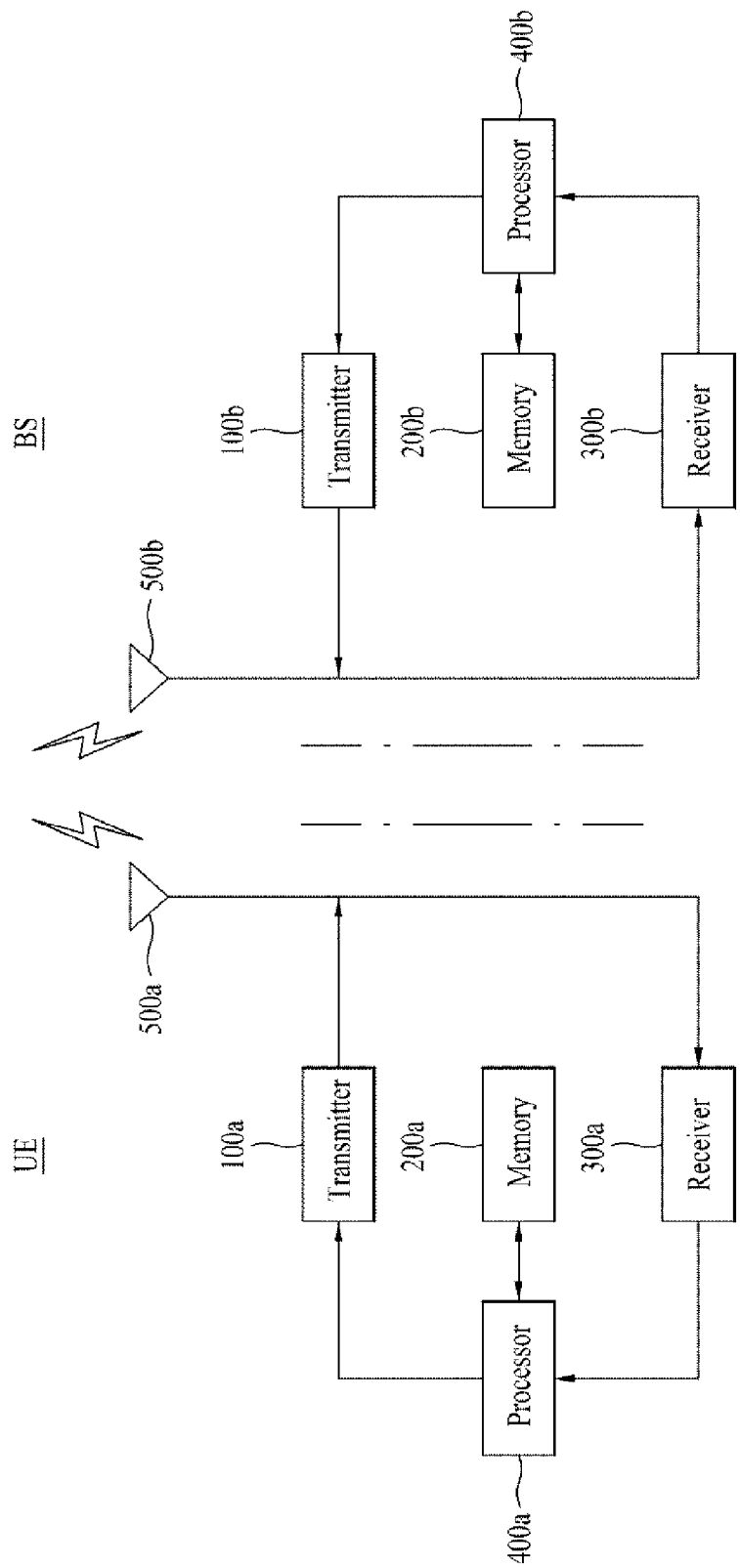
FIG. 1 is a block diagram of a UE and a BS for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an Evolved-NodeB (eNB), a Base Transceiver System (BTS), and an Access Point (AP).

In the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

In the present invention, the term frame refers to a structured data sequence that has a fixed duration used in some physical (PHY) layer standards. One frame may include a specific number of subframes, each of which may include one or more slots. One subframe/slot may be configured so as to include a plurality of OFDM symbols in the time domain. For example, one subframe may be constructed of 2 slots, each including 7 OFDM symbols. The number of subframes per frame, the number of slots per subframe, and the number of OFDM symbols per slot are determined according to the physical standard of a corresponding system.

In the present invention, a rank or a transmission rank may indicate the number of layers multiplexed/allocated to one OFDM symbol or one data resource element (RE).

In the present invention, the term Physical Uplink Control CHannel (PUCCH)/Physical Uplink Shared CHannel (PUSCH) refers to a set of resource elements that carry Uplink Control Information (UCI)/uplink data. In the present invention, when it is said that a UE transmits a PUCCH/PUSCH, this means that an uplink control information/uplink data signal is transmitted in a PUSCH/PUCCH.

On the other hand, in the present invention, when it is said that specific information is mapped to a specific constellation point, this means that the specific information is mapped to a specific complex modulation symbol. In addition, when it is said that specific information is mapped to a specific complex modulation symbol, this means that the specific information is modulated into the specific complex modulation symbol.

FIG. 1 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. In either case, the signal transmitted from each antenna port is not designed to be further deconstructed by the UE receiver (300a). The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements together comprising the antenna port. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b.

The signal processing procedure of the receivers 300a and 300b is the reverse of the signal processing procedure of the transmitters. Specifically, the receivers 300a and 300b perform decoding and demodulation of wireless signals received from the outside through the antennas 500a and 500b and deliver the resulting signals to the corresponding processors 400a and 400b. Each of the antennas 500a and 500b connected to the receivers 300a and 300b may include $N_r$ reception antennas. Each of the signals received through the reception antennas is reconstructed into a base band signal and is then reconstructed into a data stream, which was originally intended to be transmitted by the transmitters 100a and 100b, through multiplexing and MIMO demodulation.

The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
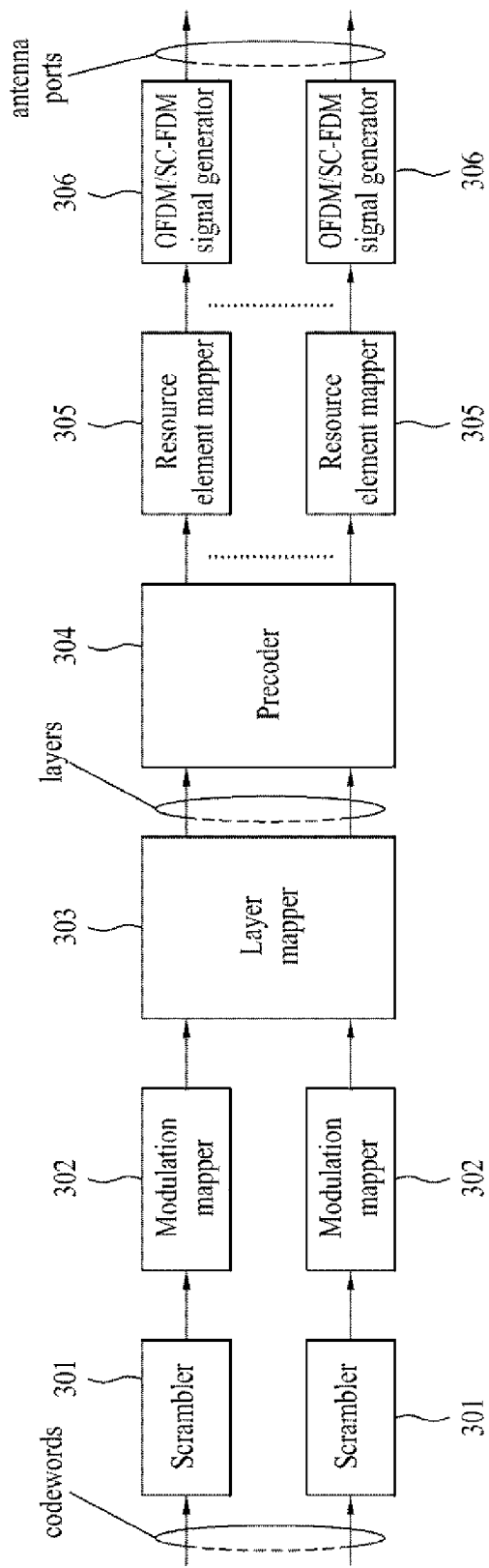
FIG. 2 is a block diagram of an exemplary transmitter in each of the UE and the BS.

Referring to FIG. 2, each of the transmitters 100a and 100b include scramblers 301, modulation mappers 302, a layer mapper 303, a precoder 304, RE mappers 305, Orthogonal Frequency Division Multiplexing (OFDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-$N_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times N_F$ matrix z.

The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$ to a receiver after digital-to-analog conversion, frequency upconversion, etc. The OFDM signal generators 306 may include an IFFT module, a CP inserter, a Digital-to-Analog Converter (DAC), a frequency upconverter, etc.

On the other hand, if the transmitter 100a or 100b applies the SC-FDMA scheme to codeword transmission, the transmitter 100a or 100b may include a Discrete Fourier Transform (DFT) module (or Fast Fourier Transform (FFT) module). The DFT module performs DFT or FFT (hereinafter referred to as DFT/FFT) on the antenna specific symbol, and outputs the DFT/FFT symbol to the resource element mapper 305.

Each of the receivers 300a and 300b may include a signal recoverer for down-converting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

On the other hand, in the case where the receiver 300a or 300b receives signals according to the SC-FDMA scheme illustrated in FIGS. 3 to 7, the receiver 300a or 300b may further include an Inverse Discrete Fourier Transform (IDFT) module (also called an IFFT module). The IDFT/IFFT module performs IDFT/IFFT on an antenna-specific symbol recovered by the resource element mapper, and thus outputs the IDFT/IFFT symbol to the multiplexer.

While it has been described in FIG. 2 that each of the transmitters 100a and 100b includes the scramblers 301, the modulation mappers 302, the layer mapper 303, the precoder 304, the RE mappers 305, and the OFDM signal generators 306, it may be further contemplated that the scramblers 301, the modulation mappers 302, the layer mapper 303, the precoder 304, the RE mappers 305, and the OFDM signal generators 306 are incorporated into each of the processors 400a and 400b of the transmitters 100a and 100b. Likewise, while it has been described in FIG. 2 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For convenience of description and better understanding of the present invention, it is assumed that the scrambler 301, the modulation mapper 302, the layer mapper 303, the precoder 304, the resource element (RE) mapper 305, and the OFDM signal generator 306 (in case of the SC-FDMA scheme, the DFT module may be further included) are contained in the transmitter 100a or 100b separated from the processor 400a or 400b configured to control the operations of the above-mentioned constituent elements 302 to 306. In addition, it is assumed that a signal recoverer, a multiplexer, and a channel demodulator may be contained in the receiver 300a or 300b separated from the processor 400a or 400b configured to control the operations of the signal recoverer, the multiplexer and the channel demodulator. However, in the case where the scrambler 301, the demodulation mapper 302, the layer mapper 303, the precoder 304, the RE mapper 305, and the OFDM signal generator 306 are contained in the processor 400a or 400b, and even in the case where the signal recoverer, the multiplexer, and the channel demodulator (in case of the SC-FDMA scheme, the IFFT module may be further included) are contained in the processor 400a or 400b, the embodiments of the present invention may also be applied.

Figure 3:
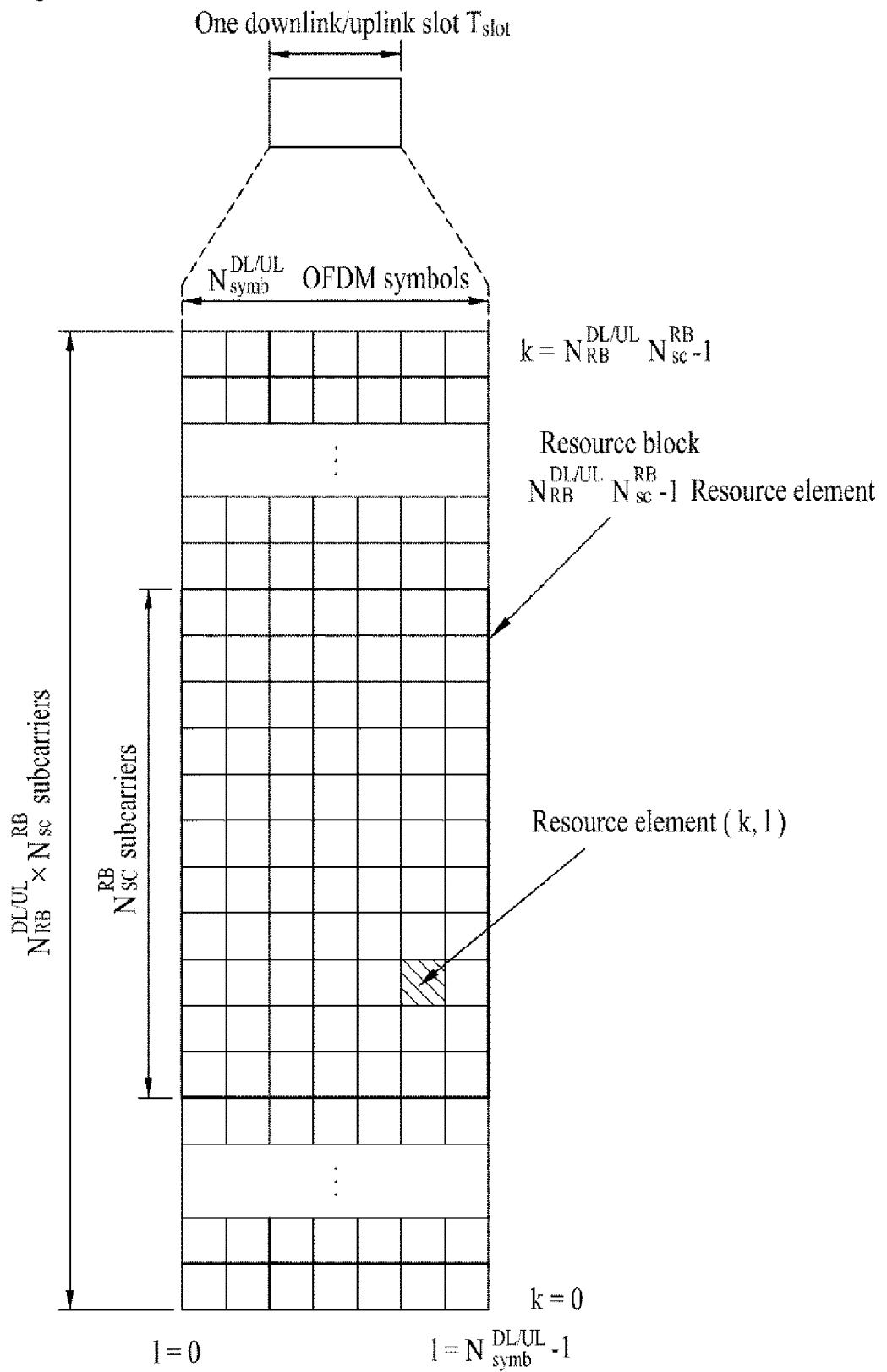
FIG. 3 illustrates a DL/UL slot structure of a wireless communication system.

FIG. 3 illustrates an exemplary structure of a DownLink/UpLink (DL/UL) slot in the wireless communication system. Specifically, FIG. 3 illustrates the structure of a resource grid in the 3GPP LTE/LTE-A system. There is one resource grid per antenna port.

Referring to FIG. 3, a slot includes a plurality of OFDM symbols in the time domain by a plurality of Resource Blocks (RBs) in the frequency domain. An OFDM symbol may refer to one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and a CP length. Each element in the resource grid for an antenna port is called Resource Element (RE). Each RE is formed by one OFDM symbol by one subcarrier. An RE is also referred to as a tone.

Referring to FIG. 3, a signal transmitted in each slot may be described by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ is dependent upon a DL transmission bandwidth, and $N^{UL}_{RB}$ is dependent upon a UL transmission bandwidth. Each OFDM symbol includes $N^{DU/UL}_{RB}N^{RB}_{sc}$ subcarriers in a frequency domain. The number of subcarriers mapped to one carrier is determined according to the FFT size. The subcarriers may be classified into a data subcarrier for data transmission, a reference signal (RS) subcarrier for RS transmission, and a null subcarrier for a guard band and DC component. The null subcarrier for the DC component is an unused subcarrier, and is mapped to a carrier frequency ($f_0$) in an OFDM signal generation process. The carrier frequency may also be called a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive sub-carriers in the frequency domain. Therefore, one PRB includes $N^{DL/UL}_{symb} \times N^{RB}_{sc}$ REs.

Each RE in the resource grid per each antenna port may be uniquely identified by an index pair (k, l) in a slot. k is a frequency-domain index ranging from 0 to $N^{DL/UL}_{RB}N^{RB}_{sc}-1$ and l is a time-domain index ranging from 0 to $N^{DL/UL}_{symb}-1$.

Uplink control information (UCI) transmitted from the UE to the BS is transmitted through a control channel or a data channel in an uplink subframe. When UCI is transmitted through a data channel, the UCI is multiplexed with data of the UE. For example, when there is a need to transmit channel state information (CSI) such as channel quality information (CQI), rank information (RI), or a precoding matrix information (PMI) and/or Acknowledgement (ACK)/Negative ACK (HARQ-ACK) in a subframe to which PUSCH transmission has been allocated, the UE may multiplex data (for example, UL-SCH data) with the CSI and/or the HARQ-ACK and transmit the multiplexed data to the BS through a PUSCH.

Figure 4:
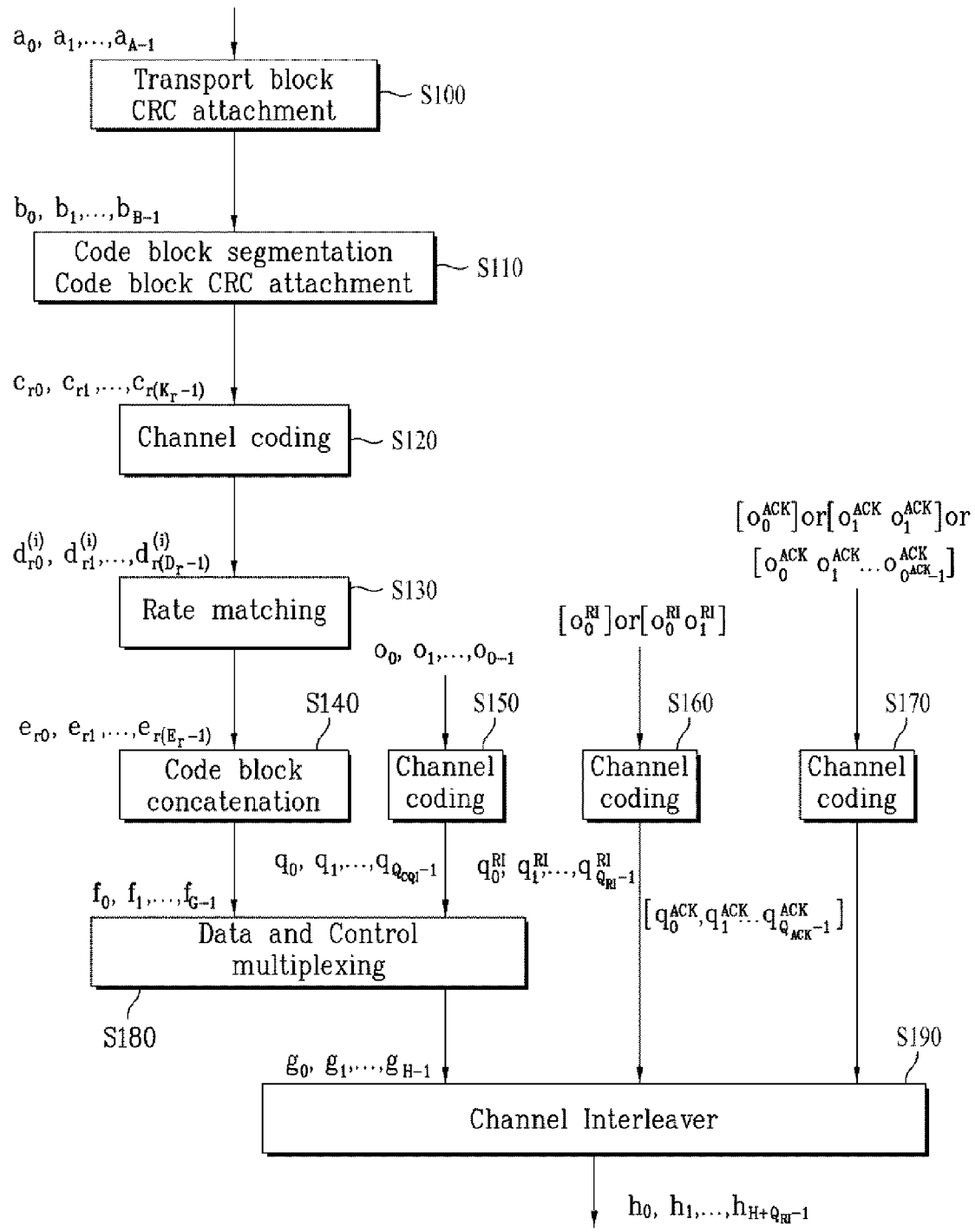
FIG. 4 illustrates a procedure for processing UL-SCH data and control information.

FIG. 4 illustrates a procedure for processing UL-SCH data and control information. The UE may multiplex the UL-SCH data with the UCI through the following processes. The following processes (S100 to S190) are performed by the UE processor 400a. The UE processor 400a may include processing blocks corresponding to the processing processes (S100 to S190), for example, a channel coding block corresponding to the processing processes S120, S150, S160, and S170, a data and control multiplexing block corresponding to the processing process S180, and a channel interleaver corresponding to the processing process S190.

As shown in FIG. 4, a Cyclic Redundancy Check (CRC) is attached to a UL-SCH transport block for error detection (S100).

The entire transport block is used to calculate CRC parity bits. The bits of the transport block are $a_0, a_1, a_2, a_3, \ldots,$ and $a_{A-1}$. The parity bits are $p_0, p_1, p_2, p_3, \ldots,$ and $p_{L-1}$. The size of the transport block is A and the number of parity bits is L.

Then, code block segmentation and code block CRC attachment are performed on the CRC-attached transport block (S110). Bit inputs for code block segmentation are $b_0, b_1, b_2, b_3, \ldots,$ and $b_{B-1}$. Here, B is the number of bits of the transport block (including the CRC). The bits after code block segmentation are $c_{r0}, c_{r1}, c_{r2}, c_{r3}, \ldots,$ and $c_{r(Kr-1)}$. Here, r denotes the code block number (r=0, 1, ..., and C−1). Kr denotes the number of bits of the code block r. C denotes the total number of code blocks.

Channel encoding for UL-SCH data is performed after code block segmentation and code block CRC attachment are performed (S120). The bits after channel encoding are $d^{(i)}_{r0}, d^{(i)}_{r1}, d^{(i)}_{r2}, d^{(i)}_{r3}, \ldots,$ and $d^{(i)}_{r(Dr-1)}$. Here, i=0, 1, and 2, and Dr denotes the number of bits of the i-th encoded stream for the code block r (i.e., Dr=Kr+4). Turbo coding may be used for channel encoding of UL-SCH data.

The UE performs rate matching on the channel-encoded UL-SCH data (S130). The bits after rate matching are $e_{r0}, e_{r1}, e_{r2}, e_{r3}, \ldots,$ and $e_{r(Er-1)}$. Here, Er is the number of bits after the r-th code block is rate-matched.

The UE performs code block concatenation on the rate-matched code blocks (S140). The bits after code block concatenation are $f_0, f_1, f_2, f_3, \ldots,$ and $f_{G-1}$. Here, G denotes the total number of bits encoded for transmission. When control information is multiplexed with the UL-SCH for transmission, the bits used for control information transmission are not included in G. Thus, $f_0, f_1, f_2, f_3, \ldots,$ and $f_{G-1}$ correspond to the UL-SCH codeword.

In the case of uplink control information, channel encoding is individually performed for each of the channel quality information (CQI and/or PMI), RI, and HARQ-ACK. Channel encoding of each of the UCI items is performed based on the number of symbols encoded for the control information item. For example, the number of encoded symbols may be used for rate matching of the encoded control information. The number of the encoded symbols corresponds to the number of modulated symbols, the number of REs, or the like in subsequent processes.

The UE performs channel encoding of CQI and/or PMI using the input bit sequence $o_0, o_1, o_2, o_3, \ldots,$ and $o_{o-1}$ (S150). The output bit sequence of channel encoding for the CQI and/or the PMI is $q_0, q_1, q_2, q_3, \ldots, q_{Q_{CQI}-1}$. A channel encoding scheme that is applied to the CQI and/or PMI varies depending on the number of bits. $Q_{CQI}$ denotes the total number of encoded bits. The encoded CQI/PMI may be rate-matched in order to allow the length of the bit sequence to match $Q_{CQI}$. Here, $Q_{CQI}=Q'_{CQI} \times Q_m$, $Q'_{CQI}$ is the number of encoded symbols for the CQI, and $Q_m$ is modulation order. $Q_m$ is set to be equal to the modulation order of the UL-SCH data.

Channel encoding of the RI is performed using the input bit sequence $[o_0^{RI}]$ or $[o_0^{RI} \, o_1^{RI}]$ (S160). Here, $[o_0^{RI}]$ and $[o_0^{RI} \, o_1^{RI}]$ denote 1-bit and 2-bit RI, respectively. Repetition coding is used for the 1-bit RI. The 2-bit RI may be encoded using a simplex code of (3, 2) and the encoded data may be cyclically repeated.

Table 1 represents exemplary encoded RI which has been generated by performing channel encoding on the 1-bit RI and Table 2 represents exemplary encoded RI which has been generated by performing channel encoding on the 2-bit RI.

TABLE 1

| $Q_m$ | Encoded RI |
|---|---|
| 2 | $[o_0^{RI} \, y]$ |
| 4 | $[o_0^{RI} \, y \, x \, x]$ |
| 6 | $[o_0^{RI} \, y \, x \, x \, x \, x]$ |

TABLE 2

| $Q_m$ | Encoded RI |
|---|---|
| 2 | $[o_0^{RI} \, o_1^{RI} \, o_2^{RI} \, o_0^{RI} \, o_1^{RI} \, o_2^{RI}]$ |
| 4 | $[o_0^{RI} \, o_1^{RI} \, x \, x \, o_2^{RI} \, o_0^{RI} \, x \, x \, o_1^{RI} \, o_2^{RI} \, x \, x]$ |
| 6 | $[o_0^{RI} \, o_1^{RI} \, x \, x \, x \, x \, o_2^{RI} \, o_0^{RI} \, x \, x \, x \, x \, o_1^{RI} \, o_2^{RI} \, x \, x \, x \, x]$ |

Table 1 and Table 2, $Q_m$ denotes modulation order. In addition, $o_2^{RI} = (o_0^{RI} + o_1^{RI})$ mod 2, where mod represents a modulo operation. x and y represent a placeholder for maximizing the Euclidean distance of a modulation symbol that carries RI when scrambling the RI bits. Each of x and y has a value of 0 or 1. The output bit sequence $q_0^{RI}, q_1^{RI}, q_2^{RI}, \ldots, q_{Q_{RI}-1}^{RI}$ is acquired by combining the encoded RI block(s). $Q_{RI}$ denotes the total number of encoded bits. The encoded RI block which is last coupled to match the length of the encoded RI with $Q_{RI}$ may be part of the encoded RI block (i.e., rate matching may be performed). Here, $Q_{RI}=Q'_{RI} \times Q_m$, $Q'_{RI}$ is the number of encoded symbols for the RI, and $Q_m$ is modulation order. $Q_m$ is set to be equal to the modulation order of the UL-SCH data.

Channel encoding of the HARQ-ACK is performed using the input bit sequence $[o_0^{ACK}]$, $[o_0^{ACK} \, o_1^{ACK}]$, $[o_0^{ACK}]$, or $[o_0^{ACK} \, o_1^{ACK} \, \ldots \, o_{o^{ACK}-1}^{ACK}]$ (S170). Here, $[o_0^{ACK}]$ and $[o_0^{ACK} \, o_1^{ACK}]$ represent a 1-bit HARQ-ACK and a 2-bit HARQ-ACK, respectively. In addition, $[o_0^{ACK} \, o_1^{ACK} \, \ldots \, o_{o^{ACK}-1}^{ACK}]$ denotes a HARQ-ACK that is constructed of information of 3 bits or more. The ACK may be encoded into 1 and NACK may be encoded into 0. Repetitive coding is used for the 1-bit HARQ-ACK. The 2-bit HARQ-ACK may be encoded using a simplex code of (3, 2) and the encoded 2-bit HARQ-ACK may be cyclically repeated.

Table 3 represents an example of the 1-bit HARQ-ACK that has been channel-encoded and Table 4 represents an example of the 2-bit HARQ-ACK that has been channel-encoded.

TABLE 3

| $Q_m$ | Encoded HARQ-ACK |
|---|---|
| 2 | $[o_0^{ACK} \, y]$ |
| 4 | $[o_0^{ACK} \, y \, x \, x]$ |
| 6 | $[o_0^{ACK} \, y \, x \, x \, x \, x]$ |

TABLE 4

| $Q_m$ | Encoded HARQ-ACK |
|---|---|
| 2 | $[o_0^{ACK} \, o_1^{ACK} \, o_2^{ACK} \, o_0^{ACK} \, o_1^{ACK} \, o_2^{ACK}]$ |
| 4 | $[o_0^{ACK} \, o_1^{ACK} \, x \, x \, o_2^{ACK} \, o_0^{ACK} \, o_1^{ACK} \, o_2^{ACK} \, x \, x]$ |
| 6 | $[o_0^{ACK} \, o_1^{ACK} \, x \, x \, x \, x \, o_2^{ACK} \, o_0^{ACK} \, x \, x \, x \, x \, o_1^{ACK} \, o_2^{ACK} \, x \, x \, x \, x]$ |

In Table 3 and Table 4, $Q_m$ denotes modulation order. For example, $Q_m$ values of 2, 4, and 6 may correspond respectively to QPSK, 16QAM and 64QAM. $o_0^{ACK}$ corresponds to a HARQ-ACK bit for the codeword 0 and $o_1^{ACK}$ correspond to a HARQ-ACK bit for the codeword 1. In addition, $o_2^{ACK} = (o_0^{ACK} + o_1^{ACK})$ mod 2, where mod represents a modulo operation. x and y represent a placeholder for maximizing the Euclidean distance of a modulation symbol that carries RI when scrambling the HARQ-ACK bits. Each of x and y has a value of 0 or 1. $Q_{ACK}$ denotes the total number of encoded bits and the bit sequence $q_0^{ACK}, q_1^{ACK}, q_2^{ACK}, \ldots, q_{Q_{ACK}-1}^{ACK}$ is acquired by combining the encoded HARQ-ACK block(s). The encoded HARQ-ACK block which is last coupled to match the length of the bit sequence with $Q_{ACK}$ may be part of the encoded HARQ-ACK block (i.e., rate matching may be performed). Here, $Q_{ACK} = Q'_{ACK} \times Q_m$, $Q'_{ACK}$ is the number of encoded symbols for the HARQ-ACK, and $Q_m$ is modulation order. $Q_m$ is set to be equal to the modulation order of the UL-SCH data.

The data/control multiplexing block in the UE multiplexes the encoded UL-SCH bits $f_0, f_1, f_2, f_3, \ldots,$ and $f_{G-1}$ and the encoded CQI/PMI bits $q_0, q_1, q_2, q_3, \ldots, q_{Q_{CQI}-1}$ and outputs the multiplexed bits $g_0, g_1, g_2, g_3, \ldots,$ and $g_{H'-1}$ (S180). $g_i$ is a column vector having a length of $Q_m$ (i=0, ..., and H'-1). H'=H/$Q_m$ and H=(G+$Q_{CQI}$). H is the total number of encoded bits allocated for the CQI/PMI and the UL-SCH data.

The channel interleaver in the UE interleaves the output of the data/control multiplexing block $g_0, g_1, g_2, g_3, \ldots,$ and $g_{H'-1}$, the encoded $RI_{q0}^{RI}, q_1^{RI}, q_2^{RI}, \ldots, q_{Q_{RI}-1}^{RI}$, and the encoded HARQ-ACK $q_0^{ACK}, q_1^{ACK}, q_2^{ACK}, \ldots, q_{Q_{ACK}-1}^{ACK}$ to ouput $h_0, h_1, h_2, \ldots, h_{H+Q_{RI}-1}$ (S190). The channel interleaver multiplexes the UCI and the UL-SCH data for PUSCH transmission. Specifically, the channel interleaver maps the UL-SCH data and the UCI to a channel interleaver matrix corresponding to PUSCH resources. When channel interleaving has been performed, a bit sequence $h_0, h_1, h_2, \ldots, h_{H+Q_{RI}-1}$ is read row-by-row from the channel interleaver matrix. The read bit sequence is mapped onto a resource grid of FIG. 3.

As described above, the UE encodes the 1-bit or 2-bit HARQ-ACK/RI and scrambles the encoded HARQ-ACK/RI so as to maximize the Euclidean distance of a modulation symbol that carries the HARQ-ACK/RI. In this case, the UE maps the encoded 1-bit or 2-bit HARQ-ACK/RI to a point located at a corner among points on a signal constellation corresponding to modulation symbols according to the modulation order $Q_m$ of data. Accordingly, when the number of bits of the UCI is less than 3, the UE can easily multiplex the UCI with the data since a number of REs required for UCI transmission are appropriately arranged over layers regardless of the transmission rank.

Along with development of communication technology, there has arisen a situation in which the UE needs to transmit HARQ-ACK/RI of 3 bits or more. For example, the LTE-A system uses a carrier aggregation or bandwidth aggregation technology that aggregates a plurality of uplink/downlink frequency blocks in order to use a greater uplink/downlink bandwidth. When a plurality of carriers having a bandwidth smaller than a target bandwidth is aggregated, the carrier bandwidths to be aggregated may be limited to a bandwidth that is used in conventional systems in order to achieve backward compatibility. For example, the conventional LTE system can support bandwidths of 1.4, 3, 5, 10, 15, and 20 MHz and an LTE-Advanced (LTE-A) system which has improved from the LTE system can support a bandwidth greater than 20 MHz using only the bandwidths supported in the LTE. Alternatively, regardless of the bandwidths used in the conventional system, a new bandwidth may be defined to support carrier aggregation. Each uplink frequency block to be aggregated is referred to as a UL resource or a UL component carrier (CC) and each downlink frequency block to be aggregated is referred to as a DL resource or a DL CC. In the LTE-A standard, a combination of a DL resource and a UL resource is defined as a cell. Here, the UL resource is an optional element. The following is a description of embodiments of the present invention, assuming that the DL cell is a component carrier.

In the case where a UE performs communication with a BS through a plurality of downlink carrier frequencies using the carrier aggregation (CA) technology, the UE may need to transmit a HARQ-ACK/RI having a size of 3 bits or more to the BS. In the case where the UE transmits a HARQ-ACK/RI of 3 bits or more, the UE encodes the HARQ-ACK/RI of 3 bits or more into a bit sequence having a specific length using block coding, unlike when a 1-bit or 2-bit HARQ-ACK/RI is transmitted. For example, a Reed-Muller code or a Turbo code may be used to encode the HARQ-ACK/RI of 3 bits or more. The UE modulates the block-coded HARQ-ACK/RI of 3 bits or more using the same modulation order as a modulation order applied to user data. For example, the block-coded HARQ-ACK/RI is modulated into a complex modulation symbol using QPSK when the modulation scheme applied to the user data is QPSK, the block-coded HARQ-ACK/RI is modulated into a complex modulation symbol using 16QAM when the modulation scheme applied to the user data is 16QAM, and the block-coded HARQ-ACK/RI is modulated into a complex modulation symbol using 64QAM when the modulation scheme applied to the user data is 64QAM. Accordingly, the HARQ-ACK/RI of 3 bits or more may not be mapped to a complex modulation symbol located at a corner in a signal constellation. On the other hand, if the number of UCI bits is greater than 2 and the modulation order changes depending on the transport block (i.e., codeword), the number of REs required for UCI transmission may change depending on the layer. In this case, interference may occur between the data and UCI signals. In the case where a transmission error has occurred in a UCI that is block-coded and transmitted, the BS may totally lose the UCI.

Since the requirement of reliability of the UCI is higher than that of data, the UCI requires higher protection than data to guarantee higher robustness. Also when the transmission rank is greater than 1, there is a need to appropriately design a UCI multiplexing scheme according to the data transmission rank so as to allow the UCI to be multiplexed with data. Accordingly, the present invention suggests a method for increasing the robustness of transmission of UCI of 3 bits or more, especially, the robustness of transmission of HARQ-ACK/RI.

In the following description of embodiments of the present invention, 4 points, which are located at corners from among signal constellation points corresponding to the modulation scheme, are referred to as corner constellation points and mapping of specific information to a corner constellation point is referred to corner constellation mapping.

Figure 5:
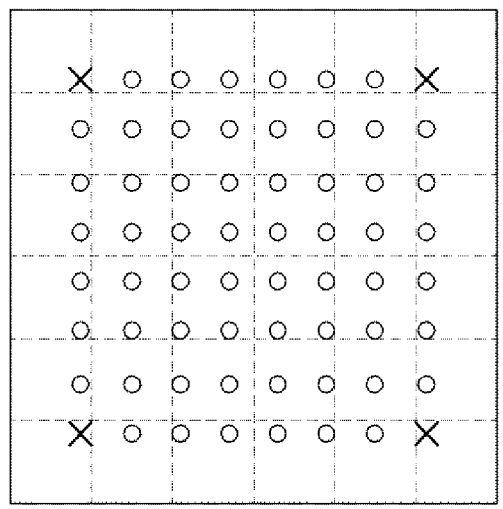
FIG. 5 illustrates corner constellation points.
Figure 5:
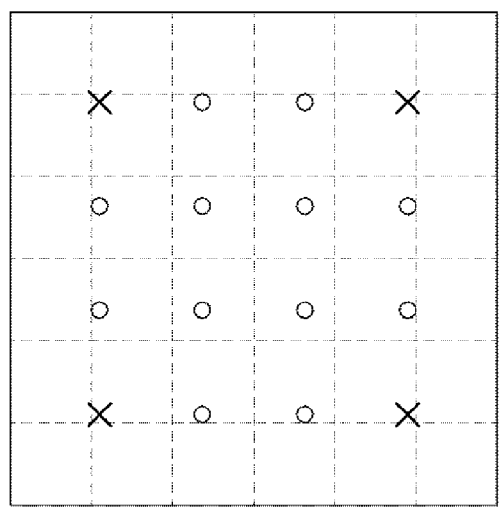
Figure 5:
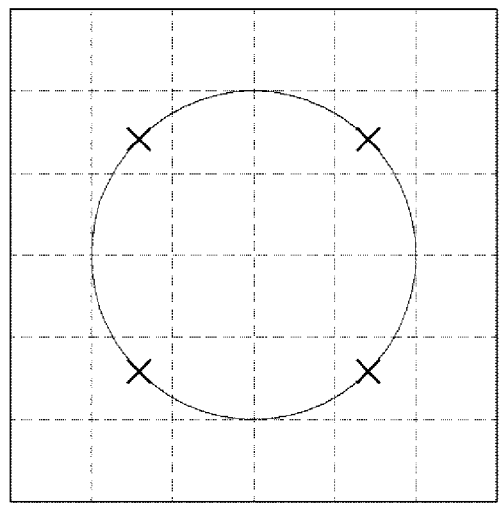

FIG. 5 illustrates corner constellation points.

In a QPSK based modulation scheme, specific information is mapped to one of 4 complex modulation symbols corresponding respectively to 4 points on a signal constellation. The 4 complex modulation symbols are orthogonal to each other, and are located at the same distance from the origin, and correspond to constellation points which are at the maximum Euclidean distance. In FIG. 5(a), the corner constellation points are 4 points denoted by X.

In a 16QAM based modulation scheme, specific information is mapped to one of 16 complex modulation symbols corresponding respectively to 16 points on a signal constellation. In FIG. 5(b), the corner constellation points are 4 points denoted by X.

In a 64QAM based modulation scheme, specific information is mapped to one of 64 complex modulation symbols corresponding respectively to 64 points on a signal constellation. In FIG. 5(c), the corner constellation points are 4 points denoted by X.

Referring to Tables 1 to 4, a specific 1-bit or 2-bit HARQ-ACK is mapped to one of the 4 points of QPSK, one of the 4 points of 16QAM, or one of the 4 points of 64QAM depending on the modulation order $Q_m$ applied to the UL-SCH data.

Conventionally, a HARQ-ACK/RI of 3 bits or more is mapped to a signal constellation point using the same modulation scheme as the modulation scheme applied to user data after block coding is performed. Thus, when the modulation scheme applied to the user data has a modulation order such as 16QAM or 64QAM, a HARQ-ACK/RI of 3 bits or more can be mapped to even a non-corner constellation point. The corner constellation points represent complex modulation symbols having a maximum Euclidean distance from the origin from among complex modulation symbols corresponding to the modulation scheme. An increase in the Euclidean distance means a decrease in the transmission error. Therefore, if a HARQ-ACK/RI of 3 bits or more is mapped to a point which does not have the maximum Euclidean distance, the transmission error of the HARQ-ACK/RI is inevitably increased compared to that of the corner constellation mapping.

Accordingly, in the present invention, even a HARQ-ACK/RI of 3 bits or more is mapped to a corner constellation point, similar to a 1-bit or 2-bit HARQ-ACK/RI. To accomplish this, in the present invention, a HARQ-ACK/RI of 3 bits or more is divided into 1-bit or 2-bit sub-HARQ-ACKs/RIs and the 1-bit or 2-bit sub-HARQ-ACKs/RIs are mapped to the corner constellation points. The present invention includes an embodiment in which channel encoding (S160/S170) is applied to each sub-HARQ-ACK/RI and the encoded sub-HARQ-ACKs/RIs are mapped to complex modulation symbols. The present invention also includes an embodiment in which each sub-HARQ-ACK/RI is mapped to a complex modulation symbol without channel encoding.

The UE processor 400a according to an embodiment of the present invention controls the modulation mapper 302 to modulate a HARQ-ACK/RI, which has been channel-encoded or has not been channel-encoded, per 1-bit or 2-bit. That is, the UE processor 400a controls the UE transmitter 100a to perform modulation on each 1-bit or 2-bit sub-HARQ-ACK/RI which has been channel-encoded or has not been channel-encoded. The modulation mapper 302 in the UE transmitter 100a modulates each sub-HARQ-ACK/RI into a complex modulation symbol(s) under control of the UE processor 400a. The modulation mapper 302 maps the 1-bit or 2-bit sub-HARQ-ACK/RI which has been channel-encoded or has not been channel-encoded to a corner constellation point among a plurality of constellation points corresponding to the modulation order according to an embodiment of the present invention. Each complex modulation symbol generated by the modulation mapper 302 is converted into an RF signal through the layer mapper 303, the precoder 304, the resource element mapper 305, and the OFDM/SC-FDM signal generator 306 and is then transmitted to the BS through the UE antenna 500a. That is, the UE transmitter 300a transmits uplink control information, which is mapped to a corner constellation point for each sub-HARQ-ACK/RI, to the BS.

The BS receiver 300b receives the uplink control information from the UE and reconstructs the uplink control information into complex modulation symbols. The BS receiver 300b demodulates the complex modulation symbols to acquire 1-bit or 2-bit sub-HARQ-ACKs/RIs. This demodulation process may be performed by a channel de-modulator of the BS. The BS acquires 1 sub-HARQ-ACK/RI if a HARQ-ACK feedback or an RI feedback transmitted by the UE is 1-bit or 2-bit information and acquires a plurality of sub-HARQ-ACKs/RIs if the HARQ-ACK feedback or the RI feedback is 3 bits or more.

The following is a description of more detailed examples of the embodiments of the present invention.

<Corner Constellation Mapping through Encoding>

■ HARQ-ACK Multiplexing Using Corner Constellation Mapping

In the case where the UE aggregates HARQ-ACK bits corresponding to a plurality of DL cells to construct a HARQ-ACK feedback, for example, in the form of a HARQ-ACK bit sequence $[o_0^{ACK} o_1^{ACK} \ldots o_{o^{ACK}-1}^{ACK}]$ of $3=O^{ACK}=11$ bits, the bit sequence may be divided into a plurality of sub-groups. If the length (i.e., the number of bits) of the bit sequence is even, the bit sequence is divided into sub-groups in the form of $[\{o_0^{ACK} o_1^{ACK}\}, \{o_2^{ACK} o_3^{ACK}\}, \ldots, \{o_{o^{ACK}-2}^{ACK} o_{o^{ACK}-1}^{ACK}\}]$. If the length of the bit sequence is odd, the last input bit becomes the last sub-group such that the bit sequence may be divided into sub-groups in the form of $[\{o_0^{ACK} o_1^{ACK}\}, \{o_2^{ACK} o_3^{ACK}\}, \ldots, \{o_{o^{ACK}-1}^{ACK}\}]$. Alternatively, the bit sequence may be divided into sub-groups in the form of $[\{o_0^{ACK} o_1^{ACK}\}, \{o_2^{ACK} o_3^{ACK}\}, \ldots, \{o_{o^{ACK}-1}^{ACK} x\}]$. In $[\{o_0^{ACK} o_1^{ACK}\}, \{o_2^{ACK} o_3^{ACK}\}, \ldots, \{o_{o^{ACK}-1}^{ACK} x\}]$, x may be a predefined bit 0 or 1 which is additionally included in the last sub-group to make the length (i.e., the number of bits) of the bit sequence even. Alternatively, x may be $o_{o^{ACK}-1}^{ACK}$ such that the last sub group is defined as $\{o_{o^{ACK}-1}^{ACK} o_{o^{ACK}-1}^{ACK}\}$. That is, the UE of the present invention divides a bit sequence having a length of n into ceiling (n/2) sub-groups. Here, n is a positive integer.

Once the input bit sequence is divided into a sub-group(s), each sub-group including 2-bit information may be encoded depending on modulation order ($Q_m$) in the following manner.

TABLE 5

| $Q_m$ | Encoded HARQ-ACK |
|---|---|
| 2 | $[o_n^{ACK} o_{n+1}^{ACK} o_{n+2}^{ACK} o_n^{ACK} o_{n+1}^{ACK} o_{n+2}^{ACK}]$ |
| 4 | $[o_n^{ACK} o_{n+1}^{ACK} x x o_{n+2}^{ACK} o_n^{ACK} x x o_{n+1}^{ACK} o_{n+2}^{ACK} x x]$ |
| 6 | $[o_n^{ACK} o_{n+1}^{ACK} x x x x o_{n+2}^{ACK} o_n^{ACK} x x x x o_{n+1}^{ACK} o_{n+2}^{ACK} x x x x]$ |

In Table 5, the encoded bit $o_{n+2}^{ACK}$ may be obtained from $o_{n+2}^{ACK}=(o_n^{ACK}+o_{n+1}^{ACK})$ mod 2. As can be seen from Table 5, each sub-group is encoded using the same encoder as that used when the HARQ-ACK feedback is constructed of 2-bit information. Here, a corner constellation point of each layer is used and a number of REs required for UCI transmission are appropriately arranged over layers even when the modulation orders of the codewords are different. On the other hand, in order to provide higher performance, bit positions of the encoded bit sequence of Table 5 may be rearranged to construct an encoded bit sequence different from that of Table 5. For example, Table 5 may be replaced with the following Table 6.

TABLE 6

| $Q_m$ | Encoded HARQ-ACK |
|---|---|
| 2 | $[o_n^{ACK} o_{n+1}^{ACK} o_n^{ACK} o_{n+1}^{ACK} o_{n+2}^{ACK} o_{n+2}^{ACK}]$ |
| 4 | $[o_n^{ACK} o_{n+1}^{ACK} x x o_n^{ACK} o_{n+1}^{ACK} x x o_{n+2}^{ACK} o_{n+2}^{ACK} x x]$ |
| 6 | $[o_n^{ACK} o_{n+1}^{ACK} x x x x o_n^{ACK} o_{n+1}^{ACK} x x x x o_{n+2}^{ACK} o_{n+2}^{ACK} x x x x]$ |

The bit sequence may be divided into 1-bit sub-groups rather than into 2-bit sub-groups. In this case, the number of input bits becomes equal to the number of sub-groups. Each sub-group including 1-bit information may be encoded depending on modulation order ($Q_m$) in the following manner.

TABLE 7

| $Q_m$ | Encoded HARQ-ACK |
|---|---|
| 2 | $[o_n^{ACK} y]$ |
| 4 | $[o_n^{ACK} y x x]$ |
| 6 | $[o_n^{ACK} y x x x x]$ |

Although x or y which is a placeholder bit is located at the last n-bit position in Tables 5 to 7, the placeholder bit may be located at a different position as needed.

On the other hand, corner constellation mapping of the present invention may be used together with block coding. If, for example, a Reed-Muller code of (32, O) is applied to a HARQ-ACK bit sequence having a length of 3 bits or more, an encoded bit sequence $[q_0^{\sim ACK} q_1^{\sim ACK} \ldots q_{31}^{\sim ACK}]$ is obtained. The encoded bit sequence $[q_0^{\sim ACK} q_1^{\sim ACK} \ldots q_{31}^{\sim ACK}]$ may be divided into 1-bit or 2-bit sub-groups and may be encoded using Tables 5 to 7.

■ RI multiplexing using corner constellation mapping

A concept similar to HARQ-ACK multiplexing using corner constellation mapping may be applied to RI multiplexing. In the case where the UE aggregates RI bits corresponding to a plurality of DL cells to construct an RI feedback, for example, in the form of an RI bit sequence $[o_0^{RI} o_1^{RI}, \ldots, o_{O^{RI}-1}^{RI}]$ of $3=O^{RI}=11$ bits, the bit sequence may be divided into a plurality of sub-groups. If the length of the bit sequence is even, the bit sequence is divided into sub-groups in the form of $[\{o_0^{RI} o_1^{RI}\}, \{o_2^{RI} o_3^{RI}\}, \ldots, \{o_{O^{RI}-2}^{RI} o_{O^{RI}-1}^{RI}\}]$. If the length of the bit sequence is odd, the last input bit becomes the last sub-group such that the bit sequence may be divided into sub-groups in the form of $[\{o_0^{RI} o_1^{RI}\}, \{o_2^{RI} o_3^{RI}\}, \ldots, \{o_{O^{RI}-1}^{RI}\}]$. Alternatively, the bit sequence may be divided into sub-groups in the form of $[\{o_0^{RI} o_1^{RI}\}, \{o_2^{RI} o_3^{RI}\}, \ldots, \{o_{O^{RI}-1}^{RI} x\}]$. In $[\{o_0^{RI} o_1^{RI}\}, \{o_2^{RI} o_3^{RI}\}, \ldots, \{o_{O^{RI}-1}^{RI} x\}]$, x may be a predefined bit 0 or 1 which is additionally included in the last sub-group to make the length (i.e., the number of bits) of the bit sequence even. Alternatively, x may be $o_{O^{RI}-1}^{RI}$ such that the last sub-group is defined as $\{o_{O^{RI}-1}^{RI} o_{O^{RI}-1}^{RI}\}$. That is, the UE of the present invention divides a bit sequence having a length of n into ceiling (n/2) sub-groups. Here, n is a positive integer.

Once the input bit sequence is divided into a sub-group(s), each sub-group including 2-bit information may be encoded depending on modulation order ($Q_m$) in the following manner.

TABLE 8

| $Q_m$ | Encoded RI |
|---|---|
| 2 | $[o_n^{RI} o_{n+1}^{RI} o_n^{RI} o_{n+1}^{RI} o_{n+2}^{RI} o_{n+2}^{RI}]$ |
| 4 | $[o_n^{RI} o_{n+1}^{RI} x x o_n^{RI} o_{n+1}^{RI} x x o_{n+2}^{RI} o_{n+2}^{RI} x x]$ |
| 6 | $[o_n^{RI} o_{n+1}^{RI} x x x x o_n^{RI} o_{n+1}^{RI} x x x x o_{n+2}^{RI} o_{n+2}^{RI} x x x x]$ |

In Table 8, the encoded bit $o_{n+2}^{RI}$ may be obtained from $o_{n+2}^{RI}=(o_n^{RI}+o_{n+1}^{RI})$ mod 2. As can be seen from Table 8, each sub-group is encoded using the same encoder as that used when the RI feedback is constructed of 2-bit information. Here, a corner constellation point of each layer is used and a number of REs required for UCI transmission are appropriately arranged over layers even when the modulation orders of the codewords are different. On the other hand, in order to provide higher performance, bit positions of the encoded bit sequence of Table 8 may be rearranged to construct an encoded bit sequence different from that of Table 8. For example, Table 8 may be replaced with the following Table 9.

TABLE 9

| $Q_m$ | Encoded RI |
|---|---|
| 2 | $[o_n^{RI} o_{n+1}^{RI} o_n^{RI} o_{n+1}^{RI} o_{n+2}^{RI} o_{n+2}^{RI}]$ |
| 4 | $[o_n^{RI} o_{n+1}^{RI} x x o_n^{RI} o_{n+1}^{RI} x x o_{n+2}^{RI} o_{n+2}^{RI} x x]$ |
| 6 | $[o_n^{RI} o_{n+1}^{RI} x x x x o_n^{RI} o_{n+1}^{RI} x x x x o_{n+2}^{RI} o_{n+2}^{RI} x x x x]$ |

The bit sequence may be divided into 1-bit sub-groups rather than into 2-bit sub-groups. In this case, the number of input bits becomes equal to the number of sub-groups. Each sub-group including 1-bit information may be encoded depending on modulation order ($Q_m$) in the following manner.

TABLE 10

| $Q_m$ | Encoded RI |
|---|---|
| 2 | $[o_n^{RI} y]$ |
| 4 | $[o_n^{RI} y x x]$ |
| 6 | $[o_n^{RI} y x x x x]$ |

Although x or y which is a placeholder bit is located at the last n-bit position in Tables 8 to 10, the placeholder bit may be located at a different position as needed.

If the HARQ-ACK feedback or the RI feedback is constructed of information of $3=O^{ACK}=11$ bits, the information bit sequence is divided into sub-groups, each including N information bits. Tables 5 to 10 have been described above with reference to the case where N=1 or N=2. However, the sub-group size N is not necessarily limited to 1 or 2 and may be a different number, for example, 3 or 4 (i.e., N=3 or 4).

<Corner Constellation Mapping without Encoding>

Corner constellation mapping of the present invention may be used without encoding described with reference to Tables 5 to 10. In this case, N bits of the sub-group are directly mapped to the constellation. For example, the following Tables may be used for direct mapping of each sub-group to the constellation, regardless of feedback information.

TABLE 11

| $Q_m$ | Encoded HARQ-ACK |
|---|---|
| 2 | [$o_n$ $o_{n+1}$] |
| 4 | [$o_n$ $o_{n+1}$ x x] |
| 6 | [$o_n$ $o_{n+1}$ x x x x] |

TABLE 12

| $Q_m$ | Encoded RI |
|---|---|
| 2 | [$o_n$ y] |
| 4 | [$o_n$ y x x] |
| 6 | [$o_n$ y x x x x] |

Table 11 may be used when the sub-group size N is 2 and Table 12 may be used when the sub-group size N is 1.

<Unit Power Based Constellation Mapping>

In the case where specific 2-bit information is multiplexed with data in order to prevent an increase in implementation complexity and/or damage of the single carrier characteristics of the SC-FDMA, generally, a QPSK-like constellation is used to indicate the 2-bit information regardless of the modulation order of the data. In the case where 16QAM or 64QAM is used for data transmission, corner constellation points of FIG. 5 may be normally used to implement the QPSK-like constellation. 4 points denoted by X in FIG. 5(a) may be used to indicate the QPSK-like constellation when the modulation order of data that is transmitted while being multiplexed with UCI is QPSK, 4 points denoted by x in FIG. 5(b) may be used to indicate the QPSK-like constellation when the modulation order of the data is 16QAM, and 4 points denoted by X in FIG. 5(c) may be used to indicate the QPSK-like constellation when the modulation order of the data is 64QAM.

Figure 6:
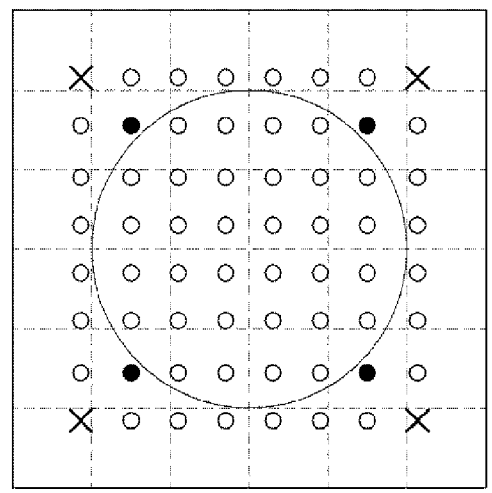
FIG. 6 illustrates an embodiment of unit power based corner constellation mapping.
Figure 6:
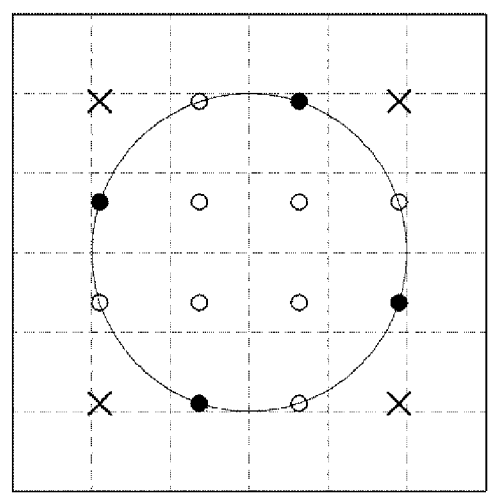
Figure 6:
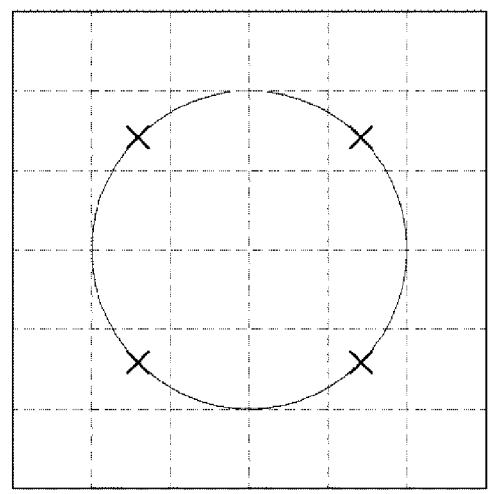

FIG. 6 illustrates an embodiment of unit power based corner constellation mapping.

As can be seen from FIG. 6, power of the QPSK-like constellation varies depending on the modulation order. Therefore, the level of transmission power may change when the modulation order changes. The present invention includes an embodiment in which 4 constellation points close to the unit power circle are used as a QPSK-like constellation in order to minimize a power difference as the modulation order changes. For example, black points shown in FIG. 6 may be used as a QPSK-like constellation.

<UCI Type Dependent Multiplexing>

The above embodiments of the present invention may be applied differently depending on the type of the UCI. For example, a 2-bit sub-group may be used for the HARQ-ACK UCI type and a 1-bit sub-group may be used for the RI UCI type.

<Rank Dependent Multiplexing>

The embodiments of the present invention may be applied differently depending on the transmission rank or the number of codewords (transport blocks) in order to optimize performance of UCI transmission.

According to the embodiments of the present invention, a HARQ-ACK/RI is mapped to a corner constellation point having a maximum Euclidean distance and therefore it is possible to decrease the UCI transmission error compared to the conventional method in which modulation is performed according to the data modulation scheme after block coding is performed.

In addition, a HARQ-ACK/RI is transmitted after being divided into a plurality of sub-groups, i.e., a plurality of sub-HARQ-ACKs/RIs. Therefore, there is an advantage in that, when a transmission error has occurred in a sub-HARQ-ACK/RI, only the sub-HARQ-ACK/RI with the transmission error is lost while other sub-HARQ-ACKs/RIs having no errors are not lost. For example, even when a transmission error has occurred in a sub-HARQ-ACK/RI signal corresponding to a HARQ-ACK/RI bit of a certain DL cell among HARQ-ACKs/RIs of multiple DL cells, it is possible to appropriately reconstruct sub-HARQ-ACK/RI signals corresponding to HARQ-ACK/RI bits of the other DL cells.

Further, in the embodiments which do not use block coding among the embodiments of the present invention, there is an advantage in that it is possible to encode HARQ-ACK/RI information of 3 bits or more using the same encoder as when a HARQ-ACK/RI feedback is constructed of 1-bit or 2-bit information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The embodiments of the present invention can be applied to a BS, a UE, or other communication devices in a wireless communication system.

The invention claimed is:

1. A method for transmitting n-bit uplink control information (UCI) from a user equipment in a wireless communication system, where n is a positive integer equal to or greater than 3, the method comprising:
dividing the n-bit UCI into ceiling (n/2) sub-groups;
encoding each of the sub-groups according to a table having the form:

| $Q_m$ | Encoded UCI |
|---|---|
| 2 | [$o_n^{UCI}$ $o_{n+1}^{UCI}$ $o_n^{UCI}$ $o_{n+1}^{UCI}$ $o_{n+2}^{UCI}$ $o_{n+2}^{UCI}$] |
| 4 | [$o_n^{UCI}$ $o_{n+1}^{UCI}$ x x $o_n^{UCI}$ $o_{n+1}^{UCI}$ x x $o_{n+2}^{UCI}$ $o_{n+2}^{UCI}$ x x] |
| 6 | [$o_n^{UCI}$ $o_{n+1}^{UCI}$ x x x x $o_n^{UCI}$ $o_{n+1}^{UCI}$ x x x x $o_{n+2}^{UCI}$ $o_{n+2}^{UCI}$ x x x x]; | and
transmitting the encoded UCI on a physical uplink data channel that carries the UCI,
wherein $Q_m$ represents a modulation order of uplink data,
wherein the modulation order is QPSK (Quadrature Phase Shift Keying), 16QAM (16-Quadrature Amplitude Modulation) or 64QAM(64-QAM) when a value of $Q_m$ is 2, 4 or 6 respectively,
wherein $o_n^{UCI}$ represents the $n^{th}$ bit of a predefined input bit sequence $o^{UCI}$,
wherein the $o_{n+2}^{UCI}$ is equal to ($o_n^{UCI}$+$o_{n+1}^{UCI}$) mod 2, and
wherein 'x' represents a placeholder for maximizing Euclidean distance of modulation symbols that carries each of the sub-groups when bits of each of the sub-groups are scrambled.

2. The method according to claim 1, wherein each of the sub-groups is mapped to one of 4 constellation points that are close to a unit power circle of QPSK and maximize the Euclidean distance among a plurality of constellation points according to the modulation order.

3. The method according to claim 1, wherein the UCI is ACK/NACK (acknowledgement/negative ACK) or RI (Rank Information).

4. The method according to claim 3, wherein the UCI with a bit sequence of $[o_0^{UCI} o_1^{UCI}, \ldots, o_{O^{UCI}-1}^{UCI}]$ is divided into sub groups of $[\{o_0^{UCI} o_1^{UCI}\}, \{o_2^{UCI} o_3^{UCI}\}, \ldots, \{o_{O^{UCI}-1}^{UCI}\}]$ when n is an odd number.

5. The method according to claim 3, the UCI with a bit sequence of $[o_0^{UCI} o_1^{UCI}, \ldots, o_{O^{UCI}-1}^{UCI}]$ is divided into sub-groups of $[\{o_0^{UCI} o_1^{UCI}\}, \{o_2^{UCI} o_3^{UCI}\}, \ldots, \{o_{O^{UCI}-1}^{UCI} y\}]$ when n is an odd number, and wherein y represents a predefined bit 0, 1 or $o_{O^{UCI}-1}^{UCI}$.

6. A user equipment for transmitting n-bit uplink control information (UCI) in a wireless communication system, where n is a positive integer equal to or greater than 3, the user equipment comprising:
 a transmitter; and
 a processor, electrically connected to the transmitter, configured to control the transmitter,
 wherein the processor divides the n-bit uplink control information into ceiling(n/2) sub-groups, encodes each of the sub-groups according to a table having the form:

| $Q_m$ | Encoded UCI |
| --- | --- |
| 2 | $[o_n^{UCI} o_{n+1}^{UCI} o_n^{UCI} o_{n+1}^{UCI} o_{n+2}^{UCI} o_{n+2}^{UCI}]$ |
| 4 | $[o_n^{UCI} o_{n+1}^{UCI} \text{ x x } o_n^{UCI} o_{n+1}^{UCI} \text{ x x } o_{n+2}^{UCI} o_{n+2}^{UCI} \text{ x x}]$ |
| 6 | $[o_n^{UCI} o_{n+1}^{UCI} \text{ x x x x } o_n^{UCI} o_{n+1}^{UCI} \text{ x x x x } o_{n+2}^{UCI} o_{n+2}^{UCI} \text{ x x x x}]$ |

, and controls the transmitter to transmit encoded UCI on a physical uplink data channel that carries the UCI,
 wherein $Q_m$ represents a modulation order of uplink data,
 wherein the modulation order is QPSK(Quadrature Phase Shift Keying), 16QAM(16-Quadrature Amplitude Modulation) or 64QAM(64-QAM) when a value of $Q_m$ is 2, 4 or 6 respectively,
 wherein $o_n^{UCI}$ represents the $n^{th}$ bit of a predefined input bit sequence $o^{UCI}$,
 wherein the $o_{n+2}^{UCI}$ is equal to $(o_n^{UCI} + o_{n+1}^{UCI}) \bmod 2$, and
 wherein 'x' represents a placeholder for maximizing Euclidean distance of modulation symbols that carries each of the sub-groups when bits of each of the sub-groups are scrambled.

7. The user equipment according to claim 6, wherein each of the sub-groups is mapped to one of 4 constellation points that are close to a unit power circle of QPSK and maximize the Euclidean distance among a plurality of constellation points according to the modulation order.

8. The user equipment according to claim 6, wherein the UCI is ACK/NACK(acknowledgement/negative ACK) or RI (Rank Information).

9. The user equipment according to claim 6, wherein the UCI with a bit sequence of $[o_0^{UCI} o_1^{UCI}, \ldots, o_{O^{UCI}-1}^{UCI}]$ is divided into sub-groups of $[\{o_0^{UCI} o_1^{UCI}\}, \{o_2^{UCI} o_3^{UCI}\}, \ldots, \{o_{O^{UCI}-1}^{UCI}\}]$ when n is an odd number.

10. The user equipment according to claim 6, wherein the UCI with a bit sequence of $[o_0^{UCI} o_1^{UCI}, \ldots, o_{O^{UCI}-1}^{UCI}]$ is divided into sub-groups of $[\{o_0^{UCI} o_1^{UCI}\}, \{o_2^{UCI} o_3^{UCI}\}, \ldots, \{o_{O^{UCI}-1}^{UCI} y\}]$ when n is an odd number, and wherein y represents a predefined bit 0, 1 or $o_{O^{UCI}-1}^{UCI}$.

* * * * *